United States Patent
Seo et al.

(10) Patent No.: US 10,274,995 B2
(45) Date of Patent: Apr. 30, 2019

(54) ROLLABLE DISPLAY DEVICE

(71) Applicant: Samsung Display Co., Ltd., Yongin-si (KR)

(72) Inventors: Tae An Seo, Hwaseong-si (KR); Sun Ho Kim, Seongnam-si (KR); Jung Hun Lee, Hwaseong-si (KR); Jin Hwan Choi, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/674,467

(22) Filed: Aug. 10, 2017

(65) Prior Publication Data
US 2018/0059727 A1 Mar. 1, 2018

(30) Foreign Application Priority Data
Aug. 29, 2016 (KR) .................... 10-2016-0110218

(51) Int. Cl.
*H05K 1/00* (2006.01)
*G06F 1/16* (2006.01)

(52) U.S. Cl.
CPC .......... *G06F 1/1652* (2013.01); *G06F 1/1643* (2013.01); *G06F 1/1656* (2013.01)

(58) Field of Classification Search
CPC ..... G06F 1/1643; G06F 1/1652; G06F 1/1656
See application file for complete search history.

(56) References Cited

U.S. PATENT DOCUMENTS

| | | | | |
|---|---|---|---|---|
| 8,493,726 B2* | 7/2013 | Visser | ................... | G06F 1/1601 361/679.05 |
| 2002/0070910 A1* | 6/2002 | Fujieda | ................ | G06F 1/1615 345/85 |
| 2005/0040962 A1* | 2/2005 | Funkhouser | .......... | G06F 1/1601 340/815.4 |
| 2006/0007368 A1* | 1/2006 | Slikkerveer | ............... | G09F 9/35 349/58 |

(Continued)

FOREIGN PATENT DOCUMENTS

| KR | 10-2014-0108825 | 9/2014 |
| KR | 10-2014-0131741 | 11/2014 |
| KR | 10-2015-0063876 | 6/2015 |

*Primary Examiner* — Yuriy Semenenko
(74) *Attorney, Agent, or Firm* — H. C. Park & Associates, PLC

(57) ABSTRACT

A rollable display device includes: a panel supporting portion including a plurality of supporters arranged in substantially parallel relationship and a plurality of hinge linking portions rotatably connecting adjacent supporters to one another, and having rolled and unrolled configurations; a flexible display panel having a display area disposed on the panel supporting portion and a non-display area outside the display area; and a driving module including a flexible circuit board having a bent portion and connected to the non-display area, and a printed circuit board (PCB) connected to the flexible circuit board. The plurality of supporters includes a housing disposed at an outermost side of the rollable display device. The housing has a hole through which the non-display area passes and a chamber communicating with the hole and receiving the driving module. A sealant is disposed between the flexible display panel and the housing at the outside of the hole.

20 Claims, 14 Drawing Sheets

(56) References Cited

U.S. PATENT DOCUMENTS

| | | | | |
|---|---|---|---|---|
| 2011/0018785 A1* | 1/2011 | Aoki | ............... | G06F 1/1601 |
| | | | | 345/1.3 |
| 2014/0240933 A1* | 8/2014 | Lee | ............... | G06F 1/1656 |
| | | | | 361/749 |
| 2014/0328031 A1 | 11/2014 | Yang et al. | | |
| 2016/0187929 A1* | 6/2016 | Kim | ............... | G06F 1/1652 |
| | | | | 345/184 |
| 2016/0231843 A1* | 8/2016 | Kim | ............... | G06F 3/0412 |
| 2016/0320804 A1* | 11/2016 | Takayanagi | ............... | G06F 1/1615 |

* cited by examiner

ROLLABLE DISPLAY DEVICE

CROSS-REFERENCE TO RELATED APPLICATION

This application claims priority from and the benefit of Korean Patent Application No. 10-2016-0110218, filed on Aug. 29, 2016, which is hereby incorporated by reference for all purposes as if fully set forth herein.

BACKGROUND

Field

The invention relates generally to rollable display devices having driving modules, and more particularly, to a rollable display device having a housing to protect the driving module of the rollable display device from damage and breakage.

Discussion of the Background

Recently, interest in large and bright display devices and interest in display devices that are conveniently portable and stored have increased. A flexible display panel is a display panel in which a plurality of pixels are disposed on a flexible substrate such as a plastic film instead of a rigid substrate, and thus it may be easily bent.

Accordingly, rollable display devices, foldable display devices, and expandable display devices, and the like that use a flexible display panel have been under development. The rollable display device using a flexible display panel may be expanded to increase visibility and may be rolled to a compact position to increase portability.

Rollable display devices typically include a support structure for supporting the flexible display panel and a driving module for transmitting a driving signal to the flexible display panel. However, the driving module of the rollable display device can be viewed by a user and broken when a flexible display panel of the rollable display device is rolled.

The above information disclosed in this Background section is only for enhancement of understanding of the background of the inventive concepts, and, therefore, it may contain information that does not form the prior art that is already known in this country to a person of ordinary skill in the art.

SUMMARY

Rollable display devices constructed according to the principles of the invention have a driving module that is disposed in a compact space of a support structure and protected from interference and damage when a flexible display panel of the rollable display device is rolled or unrolled.

Additional aspects will be set forth in the detailed description which follows, and, in part, will be apparent from the disclosure, or may be learned by practice of the inventive concepts.

According to one aspect of the invention, a rollable display device includes a panel supporting portion including a plurality of supporters arranged in substantially parallel relationship and a plurality of hinge linking portions rotatably connecting adjacent supporters to one another, and having rolled and unrolled configurations; a flexible display panel having a display area disposed on the panel supporting portion and a non-display area outside the display area; and a driving module including a flexible circuit board having a bent portion and connected to the non-display area, and a printed circuit board (PCB) connected to the flexible circuit board. The plurality of supporters includes a housing disposed at an outermost side of the rollable display device. The housing has a hole through which the non-display area passes and a chamber communicating with the hole and receiving the driving module. A sealant is disposed between the flexible display panel and the housing. The sealant may be disposed at the outside of the hole.

The flexible display panel may include a lower protecting film and a flexible substrate, the display area may be disposed on the flexible substrate, and the non-display area may include an outer portion of the display area of the lower protecting film and the flexible substrate.

The housing may further include a lower supporting body having an opening at an upper edge of the lower supporting body, and an upper supporting body connected to the lower supporting body via the opening and including the hole disposed at one lateral surface of the upper supporting body.

The hole may be opened toward the display area, and the chamber may include an inner space defined at least in part by the upper supporting body and the lower supporting body.

The flexible display panel may include an encapsulation layer covering the display area and a window covering the encapsulation layer, and the sealant may be disposed between the window and the upper supporting body.

The non-display area may include a first bent portion disposed in the chamber, the printed circuit board may be disposed at a bottom of the lower supporting body, and the flexible circuit board may be disposed between the non-display area and the printed circuit board, and may have a second bent portion.

A pad may be disposed at an edge of the non-display area, the flexible circuit board may include an output pad connected to the pad and an input pad connected to the printed circuit board, and the second bent portion may be closer to the input pad than the output pad.

The flexible display panel may include a touch sensing portion disposed on the display area and, a touch connecting portion connecting the touch sensing portion and the printed circuit board. The touch connecting portion may extend through the hole into the chamber, and may have a third bent portion.

The housing may have a shock absorbing member that is fixed to an inner wall of the upper supporting body to protect the first bent portion and the third bent portion.

The housing may include an inner supporting body and an outer supporting body spaced apart from the inner supporting body. The inner supporting body may include an upper surface, a lower surface, and a lateral surface having a convex portion in a semi-cylindrical shape. The outer supporting body may have a cover portion covering some of the upper surface, a lateral wall covering the convex portion, and a bottom portion entirely covering the lower surface.

The hole may be defined at a space between an edge of the cover portion and the inner supporting body, and the chamber may defined at a space between the inner supporting body and the outer supporting body.

Some of the display area and the non-display area may be disposed on an upper surface of the inner supporting body, the flexible display panel may include an encapsulation layer covering the display area and a window, and the sealant may be disposed between the window and the cover portion.

The non-display area received in the chamber may be covered with an auxiliary sealant.

The flexible circuit board may include a fourth bent portion adjacent to the convex portion and disposed between the convex portion and the lateral wall, and the printed circuit board may be disposed between a lower surface of the inner supporting body and the bottom portion.

The flexible circuit board may include a driver IC, and the convex portion may have a groove portion accommodating the driver IC.

The flexible display panel may include a touch sensing portion disposed on the display area and a touch connecting portion connecting the touch sensing portion and the printed circuit board, and the touch connecting portion may be disposed in the chamber through the hole and may include a fifth bent portion adjacent to the convex portion.

The housing may have a shock absorbing member fixed to an inner side of a lateral wall facing the convex portion to protect the fourth bent portion and the fifth bent portion.

At least some of the plurality of supporters may extend along a first direction and may be linked to adjacent supporters by respective hinge linking portions disposed along a second direction intersecting the first direction. At least two adjacent supporters of the plurality of supporters may be configured to be disposed at an angle relative to each other of less than about 180°.

Each of the plurality of supporters may have a width that gradually increases along the second direction, and the housing has the largest width.

The panel supporting portion may be configured to be rolled two or more times.

According to the embodiments constructed according to the principles of the invention, the non-display area of the flexible display panel and the driving module are not received in several supporting structures, but are compactly received in one receiving supporter. Accordingly, the driving module may not be viewed by a user, and it may not interfere with the panel supporting portion and the flexible display panel when the panel supporting portion and the flexible display panel are unrolled or rolled.

The foregoing general description and the following detailed description are exemplary and explanatory and are intended to provide further explanation of the claimed subject matter.

DETAILED DESCRIPTION OF THE ILLUSTRATED EMBODIMENTS

Figure 1:
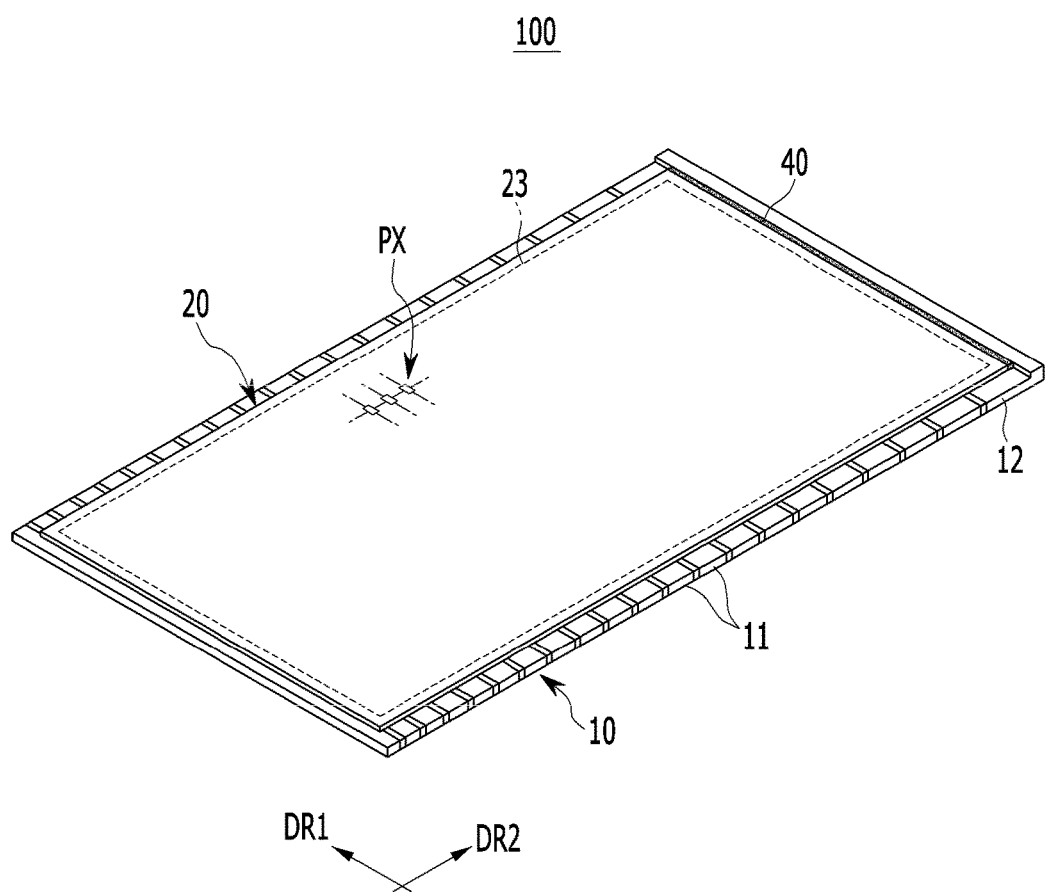
FIG. 1 is a perspective view of an embodiment of a rollable display device constructed according to the principles of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a perspective view of an embodiment of a rollable display device constructed according to the principles of the invention.

Referring to FIG. 1, a rollable display device 100 according to an exemplary embodiment includes a panel supporting portion 10 and a flexible display panel 20 positioned on the panel supporting portion 10. The flexible display panel 20 is fixed to the panel supporting portion 10, and it may be widely spread or roundly rolled according to a shape of the panel supporting portion 10.

The flexible display panel 20 includes a flexible substrate (not shown) such as a plastic film, and a plurality of pixels PX disposed on the flexible substrate. The flexible display panel 20 may be one of an organic light emitting panel, a liquid crystal panel, and an electrophoretic display panel, but is not limited thereto. A stacked structure of the flexible display panel 20 will be described later.

The panel supporting portion 10 may be formed as a hinge-linked multi joint structure. Specifically, the panel supporting portion 10 includes supporters 11 arranged in parallel, and a plurality of hinge linking portions for linking the supporters 11. The supporters 11 have a rod-like shape and extend along a first direction DR1, and they are integrally connected along a second direction DR2 by the plurality of hinge linking portions, as described in more detail below.

Figure 2:
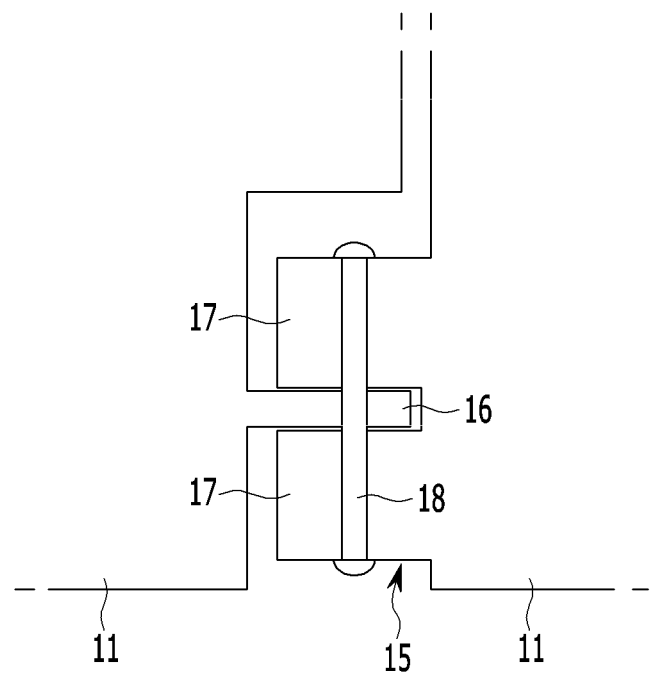
FIG. 2 and FIG. 3 are partial enlarged plan and side views, respectively, of the hinged connection between adjacent individual supporting members of a panel supporting portion of the rollable display device of FIG. 1 according to an exemplary embodiment.
Figure 3:
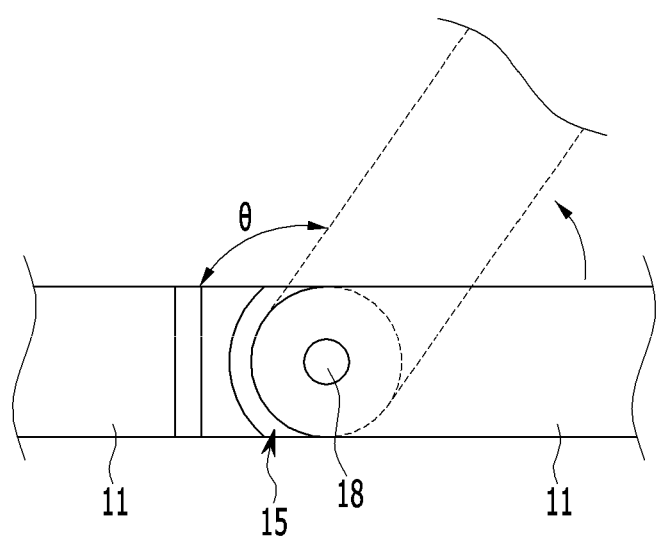

FIG. 2 and FIG. 3 are partial enlarged plan and side views, respectively, of the hinged connection between adjacent individual supporting members of a panel supporting portion of the rollable display device of FIG. 1 according to an exemplary embodiment. A hinge linking portion 15 shown in FIG. 2 and FIG. 3 is just an example, thus the inventive concepts are not limited thereto.

Referring to FIG. 1 to FIG. 3, the hinge linking portion 15 may include a first link arm 16 fixed to a lateral surface of one of supporters 11, a second link arm 17 fixed to a lateral surface of another one of the supporters 11 adjacent to the one of the supporters 11, and a fixing pin 18 passing through and combining the first link arm 16 and the second link arm 17.

The two adjacent supporters 11 are rotatable about the fixing pin 18, thus the relative angle therebetween may vary. For example, the supporters 11 may be aligned one another in the same plane (the relative angle between the supporters 11 is 180 degrees), and when at least one of the supporters 11 rotates about the fixing pin 18, the relative angle between the supporters 11 (θ shown in FIG. 3) may be smaller than 180 degrees.

In this case, at least one of the supporters 11 may rotate in a direction in which the flexible display panel 20 is inwardly and concavely deformed. This direction is designated as a forward direction, and it is identical to a counterclockwise direction of FIG. 3. In a state that the supporters 11 are aligned one another, they may be temporarily fixed by a stopper (not shown) to prevent being bent in a backward direction.

The hinge linking portion 15 may be formed to have predetermined friction force. In this case, two adjacent supporters 11 may maintain their relative angle while predetermined external force is applied thereto. That is, the supporters 11, while the predetermined external force is applied thereto, may maintain a predetermined configuration.

Referring back to FIG. 1, the panel supporting portion 10 may be flatly spread in a substantially planar shape, and at least one portion thereof may be concavely bent. The flexible display panel 20 may be substantially flat or concavely deformed in at least one portion according to one exemplary shape of the panel supporting portion 10.

Figure 4:
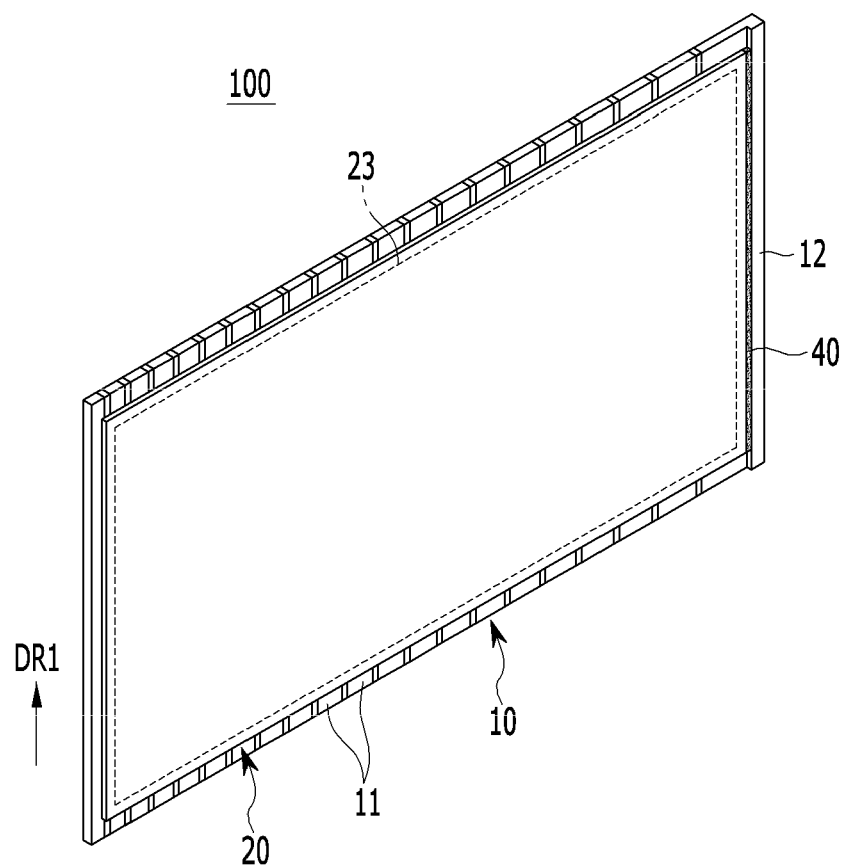
FIG. 4 is a perspective view of the rollable display device of FIG. 1 illustrating an exemplary monitor usage mode of the rollable display device.

FIG. 4 is a perspective view of the rollable display device of FIG. 1 illustrating an exemplary monitor usage mode of the rollable display device.

Referring to FIG. 4, the rollable display device 100 may stand upright, e.g., perpendicular to a reference surface (not shown) such as a desk, and thus may be used as a monitor. In this case, the first direction DR1 of the panel supporting portion 10 is the opposite direction to gravity. In a monitor usage mode, the rollable display device 100 may be flattened or concavely curved at a predetermined curvature. FIG. 4 illustrates the rollable display device is flattened, but the inventive concepts are not limited thereto.

Figure 5:
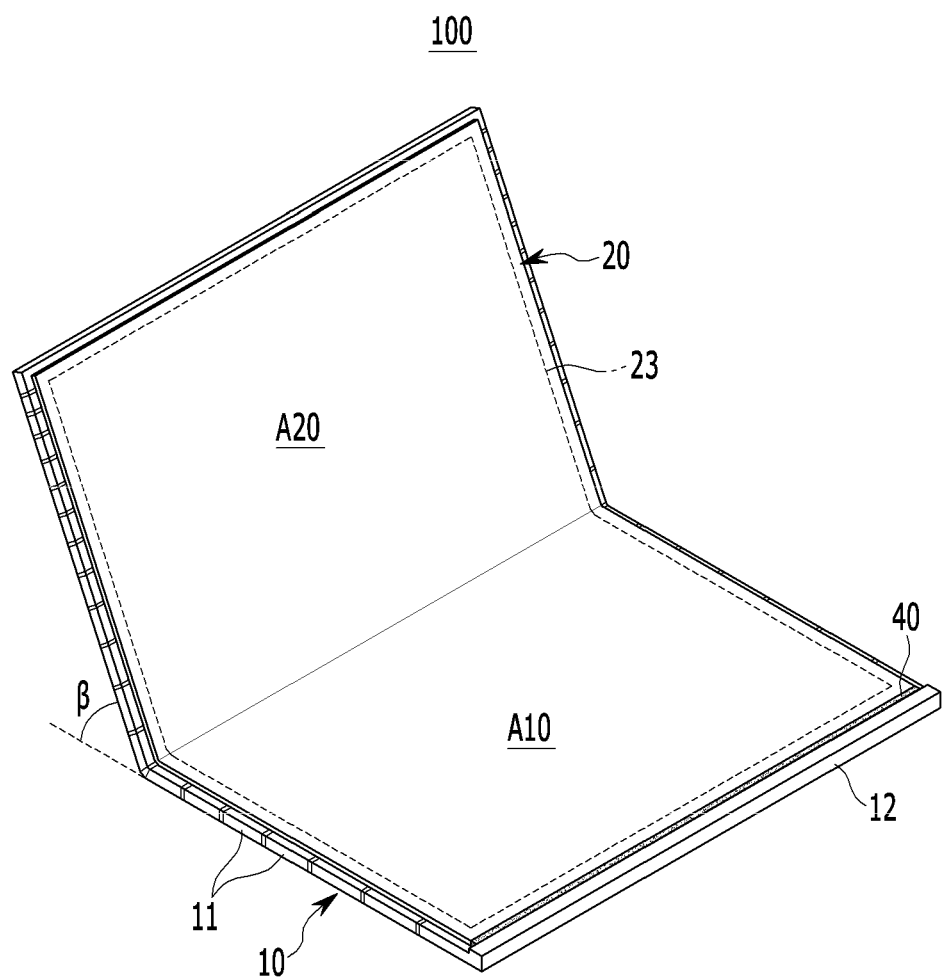
FIG. 5 is a perspective view of the rollable display device of FIG. 1 illustrating an exemplary laptop usage mode of the rollable display device.

FIG. 5 is a perspective view of the rollable display device of FIG. 1 illustrating an exemplary laptop usage mode of the rollable display device.

Referring to FIG. 5, one of the supporters 11 positioned at the center or near the center of the panel supporting portion 10 is rotated by a hinge linking portion (not shown) to have a relative angle smaller than 180 degrees with respect to another one of the supporters 11 adjacent thereto. In this case, the rollable display device 100 includes a first flat portion A10 and a second flat portion A20 angled relative to the first flat portion A10.

The first flat portion A10 may be positioned to be parallel to a reference surface (not shown) such as a surface of a desk, and the second flat portion A20 may have an angle (β) of about 50 degrees to 80 degrees with respect to the reference surface. A keyboard may be displayed on a portion of the flexible display panel 20 corresponding to the first flat portion A10, and a screen for documents or motion pictures, or any other viewable information, may be displayed on a portion of the flexible display panel 20 corresponding to the second flat portion A20. The rollable display device 100 may be used as a laptop.

Figure 6:
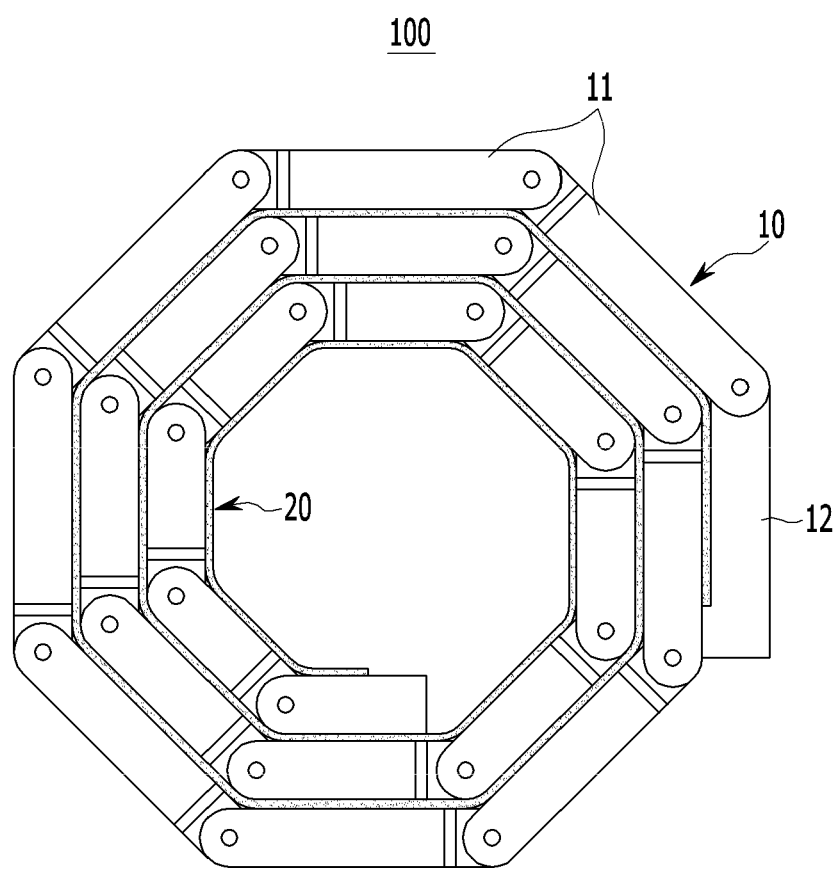
FIG. 6 is a schematic side view of the rollable display device of FIG. 1 in a rolled, compact configuration.

FIG. 6 is a schematic side view of the rollable display device of FIG. 1 in a rolled, compact configuration.

Referring to FIG. 1 and FIG. 6, the supporters 11 may be formed so that their widths gradually vary along the second direction DR2. In this case, a supporter having the smallest width is positioned at one side of the panel supporting portion 10, and a supporter having the largest width is positioned at the opposite side thereof. The rollable display device 100 may be rolled two or more times based on the supporter having the smallest width.

The supporters 11 include a receiving supporter 12 positioned at an outermost side of the rollable display device 100. The receiving supporter 12 may be a supporter in the form of a housing having the largest width among the supporters 11, but the inventive concepts are not limited thereto.

Figure 7A:
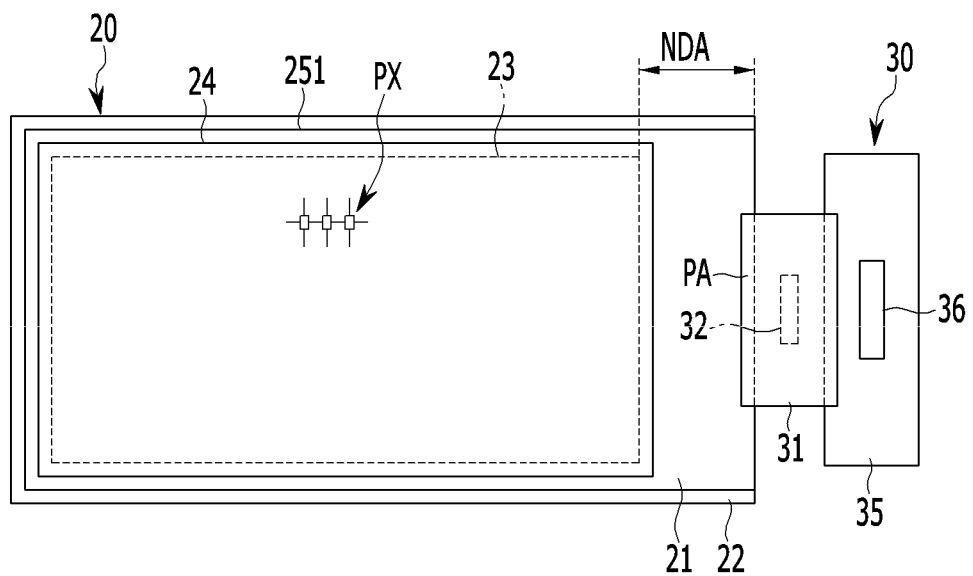
FIG. 7A to FIG. 7C are top plan views of a flexible display panel and a driving module of the rollable display device of FIG. 1 in an unrolled or expanded configuration.
Figure 7B:
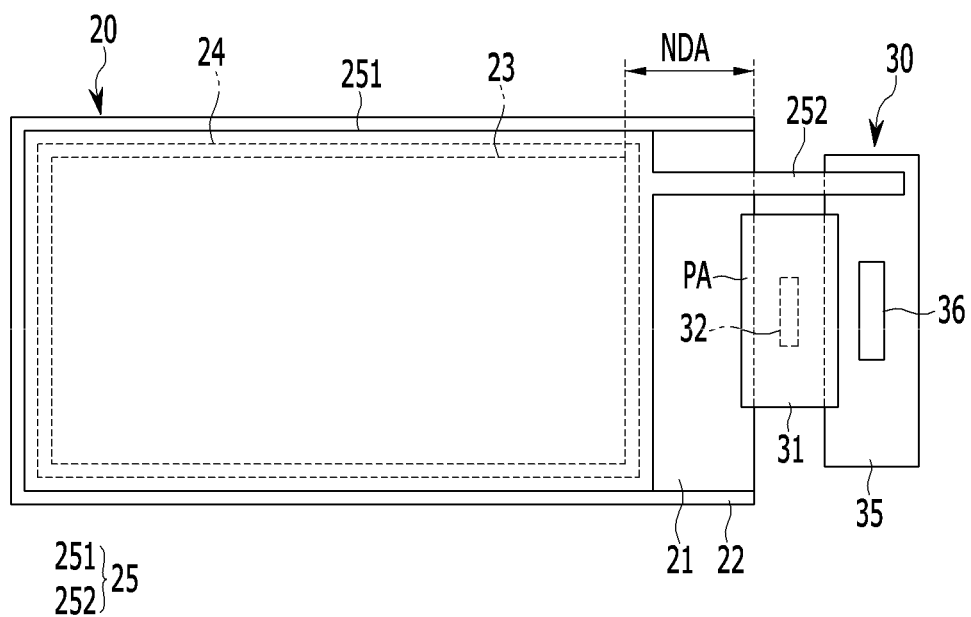
Figure 7C:
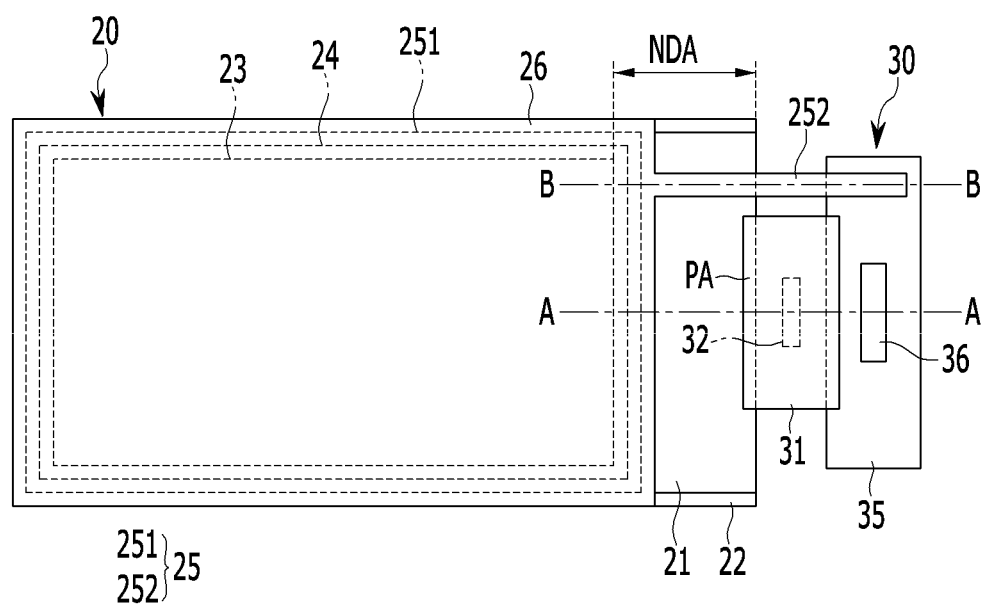

FIG. 7A to FIG. 7C are top plan views of a flexible display panel and a driving module of the rollable display device of FIG. 1 in an unrolled or expanded configuration. Referring to FIG. 7A, the flexible display panel 20 may include a flexible substrate 21, a lower protecting film 22 for supporting the flexible substrate 21, a display area 23 positioned on the flexible substrate 21, and an encapsulation layer 24 for covering the display area 23. The flexible display panel 20 is connected to a driving module 30, and the driving module 30 transmits a driving signal to the display area 23.

The flexible substrate 21 may include polyimide, and the lower protecting film 22 may include polyethylene terephthalate. The lower protecting film 22 may be formed to have the same size as the size of the flexible substrate 21.

The display area 23 may include a plurality of driving circuits (not shown) to control the illumination of a plurality of pixels PX, as is known in the art. In a case of an organic light emitting panel, the driving circuit includes at least two thin film transistors and at least one capacitor, and the pixel PX includes a hole injection electrode (anode), an electron injection electrode (cathode), and an organic emission layer. The encapsulation layer 24 may be formed of an inorganic layer or a multilayer of an organic layer and an inorganic layer.

The flexible substrate 21 includes the display area 23 and a non-display area (NDA) outside the display area 23. An edge of the non-display area (NDA) spaced apart from the display area 23 is a pad (PA), and pad electrodes (not shown) electrically connected to signal lines of the display area 23 are disposed at the pad (PA).

The driving module 30 may include a flexible circuit board 31 connected to the pad (PA) of the flexible display panel 20, and a printed circuit board 35 connected to the flexible circuit board 31. The flexible circuit board 31 may include an integrated driving circuit 32, and the printed circuit board 35 may include a control circuit 36. The flexible circuit board 31 may be a chip on film (COF), and the printed circuit board 35 may be rigid while the flexible circuit board 31 may not be rigid.

As is known in the art, the printed circuit board 35 may transmit image data and a timing synchronization signal to the integrated driving circuit 32 of the flexible circuit board 31. The integrated driving circuit 32 may generate a data signal and a pixel driving signal for displaying an image based on the image data and the timing synchronization signal, and then may transmit them to the pad (PA).

Referring to FIG. 7B, the flexible display panel 20 may include a touch portion 25. The touch portion 25 includes a touch sensor (not shown) that may input information when a finger of a user or a pen, stylus or other input device contacts a screen thereof. The touch sensor may operate through various methods known in the art, and a representative method thereof is a capacitive type which senses a position where a capacitance change is generated depending on the contact.

The touch portion 25 may include a touch sensing portion 251 covering the display area 23 and the encapsulation layer 24, and a touch connecting portion 252 connecting the touch sensing portion 251 and the printed circuit board 35. The touch sensing portion 251 may include the touch sensor, and the touch connecting portion 252 may include a wire for electrically connecting the touch sensor and the printed circuit board 35. The touch sensing portion 251 may be larger than the encapsulation layer 24.

A reflection preventing portion (not shown) for suppressing reflection of ambient light may be positioned between the encapsulation layer 24 and the touch sensing portion 251. The reflection preventing portion may include a polarization film or a color filter, but is not limited thereto.

Referring to FIG. 7C, the flexible display panel 20 may include a window 26. The window 26 is positioned at an uppermost portion of the flexible display panel 20 to protect the touch portion 25 and the display area 23 from external impact or interference. The window 26 may be larger than the touch sensing portion 251. The window 26 may include a light blocking film (not shown) attached to a region thereof that does not overlap the display area 23.

Figure 8A:
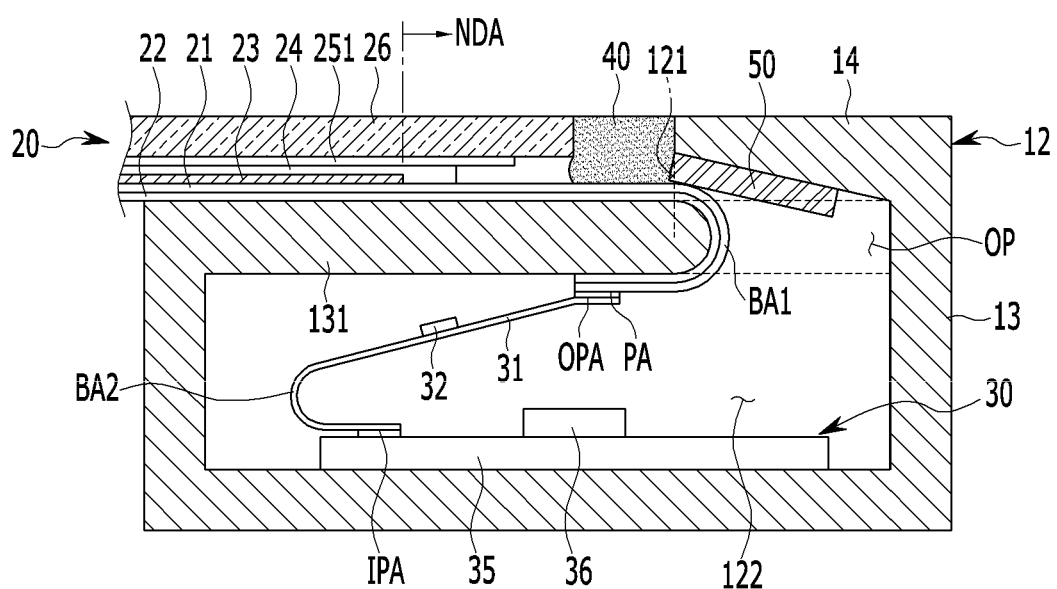
FIG. 8A is a cross-sectional view of the rollable display device of FIG. 1 taken along sectional line A-A of FIG. 7C.
Figure 8B:
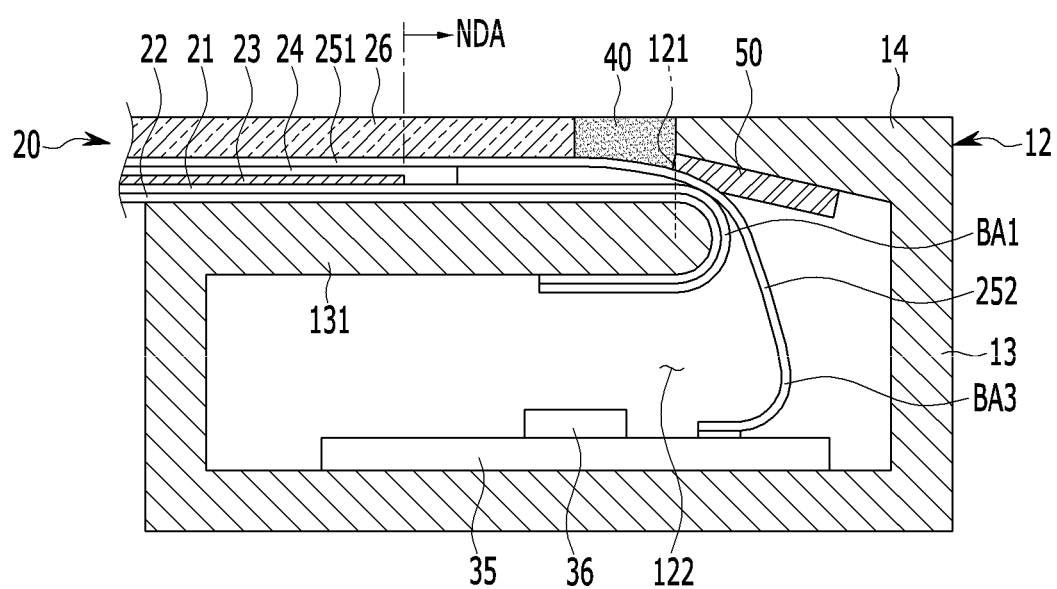
FIG. 8B is a cross-sectional view of the rollable display device of FIG. 1 taken along sectional line B-B of FIG. 7C.
Figure 9:
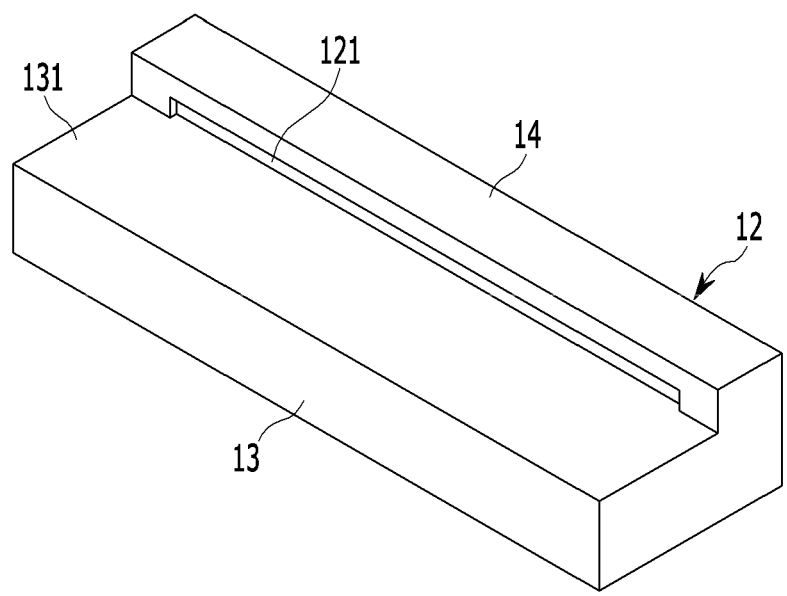
FIG. 9 is a perspective view of an exemplary receiving supporter of the rollable display device of FIG. 8A.

FIG. 8A is a cross-sectional view of the rollable display device of FIG. 1 taken along sectional line A-A of FIG. 7C. FIG. 8B is a cross-sectional view of the rollable display device of FIG. 1 taken along sectional line B-B of FIG. 7C. FIG. 9 is a perspective view of an exemplary receiving supporter of the rollable display device of FIG. 8A.

Referring to FIGS. 8A, 8B, and 9, the receiving supporter 12 includes a retaining hole 121 through which the non-display area (NDA) of the flexible substrate 21 passes and is received therein, and a module receiving portion 122 that leads to the retaining hole 121 and receives the driving module 30.

For example, the receiving supporter 12 may be defined by a lower supporting body 13 having an a box-like shape with an opening OP formed at an upper edge thereof, and an upper supporting body 14 that is connected to the lower supporting body 13 over the opening OP and is provided with the retaining hole 121 at one lateral surface thereof. The retaining hole 121 opens toward the display area 23, and the inside of the upper supporting body 14 may lead to the inside of the lower supporting body 13 such that the insides of the upper supporting body 14 and the lower supporting body 13 may form a chamber inside the module receiving portion 122.

In the module receiving portion 122, the non-display area (NDA) of the flexible substrate 21 includes a first bent portion BA1. The first bent portion BA1 is positioned between the display area 23 and the pad (PA). By the first bent portion BA1, the pad (PA) is positioned at a lowermost portion of the flexible substrate 21 and the driving module 30 is positioned at a lower portion of the flexible substrate 21. For forming the first bent portion BA1, an edge of an upper plate 131 of the lower supporting body 13 may have a semi-circular sectional shape.

The flexible circuit board 31 is connected to the printed circuit board 35 at one end (an input pad (IPA)), and is connected to the pad (PA) of the flexible substrate 21 at the other end (an output pad (OPA)). The flexible circuit board 31 includes a second bent portion BA2. The second bent portion BA2 is positioned to be closer to the input pad (IPA) than the output pad (OPA). By the second bent portion BA2, the input pad (IPA) is positioned at a lowermost portion of the flexible circuit board 31, and the printed circuit board 35 is positioned on a bottom surface of the lower supporting body 13.

The touch connecting portion 252 of the touch portion 25 passes through the retaining hole 121 to be positioned in the module receiving portion 122. The touch connecting portion 252 may include a third bent portion BA3, and an end portion of the touch connecting portion 252 may be connected to the printed circuit board 35, which is securely mounted to the bottom surface of lower supporting body 13.

The encapsulation layer 24, the touch sensing portion 251, and the window 26 of the flexible display panel 20 are not bent in the module receiving portion 122. That is, only the flexible substrate 21 and the lower protecting film 22 are bent in the module receiving portion 122 to form the first bent portion BA1. In this case, an increase in stress of the flexible display panel 20 due to the bending may be suppressed.

A sealant 40 is positioned between the flexible display panel 20 and the receiving supporter 12 at the outside of the retaining hole 121. The sealant 40 may be positioned between the window 26 and the upper supporting body 14, while covering some of the non-display area (NDA) of the outside of the retaining hole 121 and the touch connecting portion 252. The sealant 40 includes a waterproof and vibration-proof polymer resin, thus it may block penetration of moisture and transmission of vibration, thereby preventing the flexible display panel 20 from being damaged.

The receiving supporter 12 may include a shock absorbing sheet 50 fixed to an internal wall of the upper supporting body 14. The shock absorbing sheet 50 may contact the first bent portion BA1 and the touch connecting portion 252, and it may absorb external impact to protect the first bent portion BA1 and the touch connecting portion 252.

By the first bent portion BA1 and the second bent portion BA2, the flexible substrate 21, the flexible circuit board 31, and the printed circuit board 35 form a triple-stacked structure (i.e., one that is folded over three times) such that volume thereof may be minimized to be compactly accommodated in the module receiving portion 122 of the receiving supporter 12. That is, the driving module 30 is not received in several supporters but is compactly accommodated in and fixedly connected to one receiving supporter 12.

Accordingly, the driving module 30 mounted in the module receiving portion 122 is not viewed by a user, and does not interfere with the panel supporting portion 10 and the flexible display panel 20 while the panel supporting portion 10 and the flexible display panel 20 are unrolled or rolled.

In addition, the driving module 30 is protected by the receiving supporter 12, thereby preventing it from being broken.

Figure 10A:
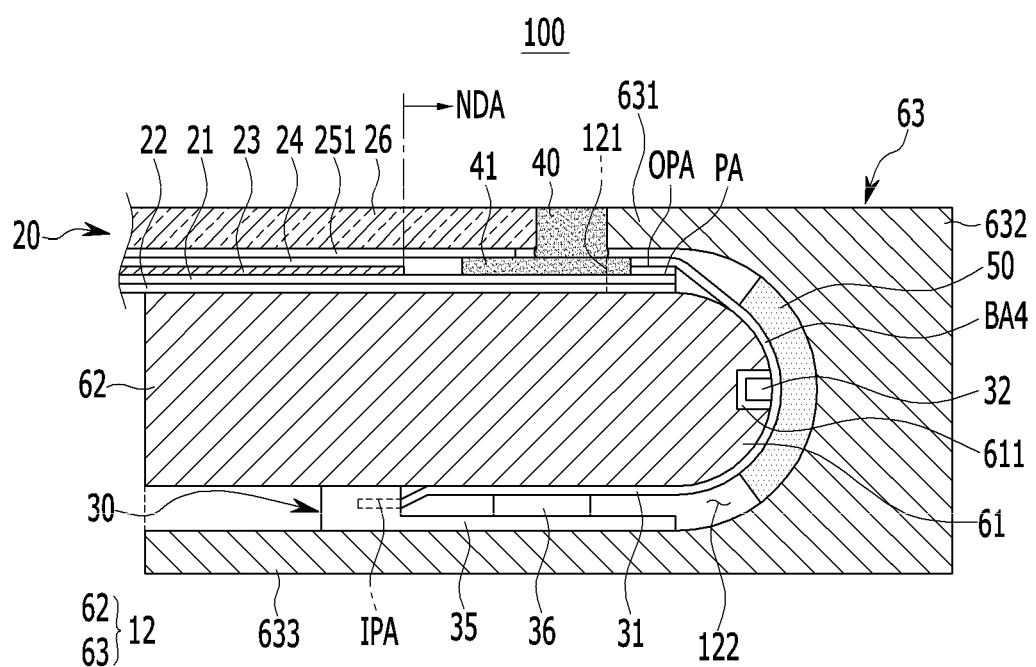
FIG. 10A is a cross-sectional view of the receiving supporter of the rollable display device of FIG. 1 taken along sectional line A-A of FIG. 7C according to another exemplary embodiment.
Figure 10B:
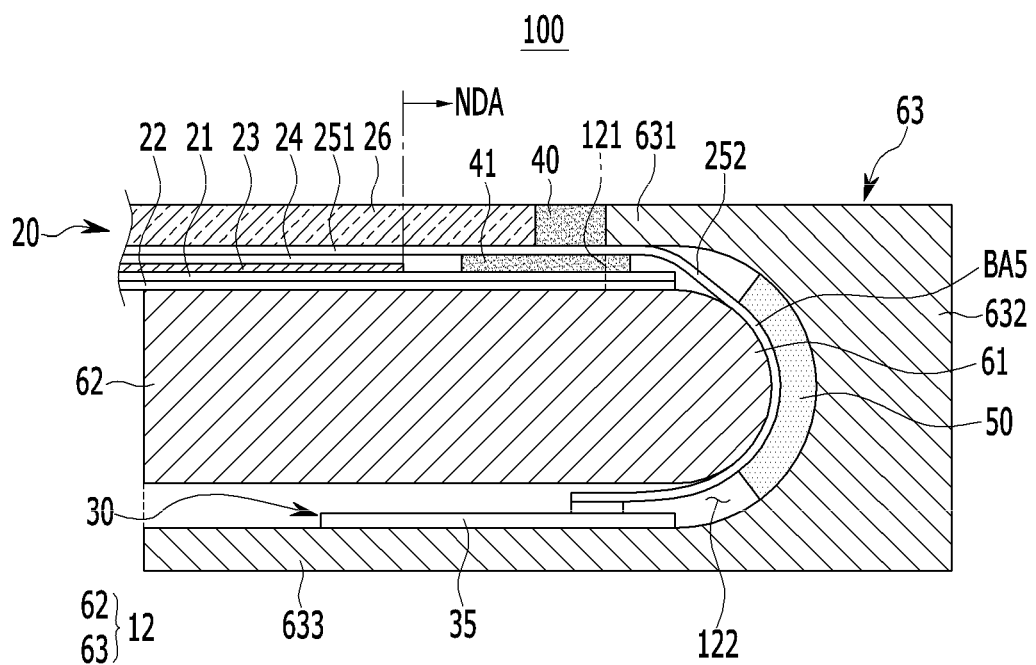
FIG. 10B is a cross-sectional view of the receiving supporter of the rollable display device of FIG. 1 taken along sectional line B-B of FIG. 7C according to another exemplary embodiment.

FIG. 10A is a cross-sectional view of the receiving supporter of the rollable display device of FIG. 1 taken along sectional line A-A of FIG. 7C according to another exemplary embodiment. FIG. 10B is a cross-sectional view of the receiving supporter of the rollable display device of FIG. 1 taken along sectional line B-B of FIG. 7C according to another exemplary embodiment.

The rollable display devices in FIGS. 10A and 10B are similar to the rollable display device 100 of FIGS. 8A and 8B. As such, duplicative descriptions are primarily omitted to avoid obscuring exemplary embodiments.

Referring to FIGS. 10A and 10B, in the rollable display device 100 according to another exemplary embodiment, the receiving supporter 12 includes a rod-shaped inner supporting body 62 provided with a semi-cylindrical shape by a convex portion 61 at one surface thereof and an outer supporting body 63 surrounding some of the inner supporting body 62 while being spaced apart from the inner supporting body 62 by a predetermined distance.

The outer supporting body 63 may be defined by a cover portion 631 covering some of an upper surface of the inner supporting body 62, a lateral wall 632 covering the convex portion 61, and a bottom portion 633 entirely covering a lower surface of the inner supporting body 62. A space between an edge of the cover portion 631 and the inner supporting body 62 corresponds to the retaining hole 121, and an overall space between the inner supporting body 62 and the outer supporting body 63 corresponds to the module receiving portion 122.

The flexible display panel 20 is positioned on the upper surface of the inner supporting body 62, and the non-display area (NDA) of the flexible substrate 21 passes through the retaining hole 121. Some of the non-display area (NDA) and the pad (PA) are positioned in the module receiving portion 122, but is not bent in the module receiving portion 122.

The flexible circuit board 31 includes a fourth bent portion BA4 bent along the convex portion 61, and the printed circuit board 35 is positioned between the bottom portion 633 and the flexible circuit board 31. The convex portion 61 of the inner supporting body 62 may include a groove portion 611 accommodating a driver IC 32 of the flexible circuit board 31. In this case, the driver IC 32 may be positioned therein without interfering with the convex portion 61, and heat of the driver IC 32 may be discharged to the outside through the groove portion 611.

The touch connecting portion 252 of the touch portion 25 passes through the retaining hole 121 to be positioned in the module receiving portion 122. The touch connecting portion 252 includes a fifth bent portion BA5 bent along the convex portion 61. An end portion of the touch connecting portion 252 is connected to the printed circuit board 35.

The sealant 40 is positioned between the flexible display panel 20 and the receiving supporter 12 at the outside of the retaining hole 121. The sealant 40 may be positioned between the window 26 and the cover portion 631, while covering some of the non-display area (NDA) of the outside of the retaining hole 121 and the touch connecting portion 252.

In this case, the non-display area (NDA) positioned in the module receiving portion 122 may be covered with an auxiliary sealant 41 including a polymer resin such as the sealant 40. In this case, in a region from an edge of the window 26 to the pad (PA), which may be wider than that of the first exemplary embodiment, penetration of moisture and transmission of vibration may be blocked.

The receiving supporter 12 may include the shock absorbing sheet 50 fixed to the inside of the lateral wall 632 facing the convex portion 61. The shock absorbing sheet 50 may contact the fourth bent portion BA4 or the fifth bent portion BA5, and may absorb external impact to protect the flexible circuit board 31 and the touch connecting portion 252. The driving module 30 is compactly accommodated in the module receiving portion 122 of the receiving supporter 12 and does not interfere with the panel supporting portion 10 and the flexible display panel 20 while the panel supporting portion 10 and the flexible display panel 20 are unrolled or rolled.

In the rollable display device 100 according to another exemplary embodiment, the flexible display panel 20 does not include a bent portion in the module receiving portion 122, thus a stress increase due to the bending does not occur. Since the fourth bent portion BA4 of the flexible circuit board 31 has a smaller curvature than that of the second bent portion BA2, the stress increase thereat may be minimized.

Although certain exemplary embodiments and implementations have been described herein, other embodiments and modifications will be apparent from this description. Accordingly, the inventive concepts is not limited to such embodiments, but rather to the broader scope of the presented claims and various obvious modifications and equivalent arrangements.

What is claimed is:

1. A rollable display device, comprising:
a panel supporting portion comprising a plurality of supporters arranged in substantially parallel relationship and a plurality of hinge linking portions rotatably connecting adjacent supporters to one another, the panel supporting portion having rolled and unrolled configurations;
a flexible display panel having a display area disposed on the panel supporting portion and a non-display area outside the display area, a lower protecting film and a flexible substrate; and
a driving module including a flexible circuit board having a bent portion and connected to the non-display area, and a printed circuit board (PCB) connected to the flexible circuit board,
wherein the plurality of supporters comprises a housing disposed at an outermost side of the rollable display device, the housing being connected to an adjacent supporter of the plurality of supporters by one of the plurality of hinge linking portions, and
wherein the housing has a hole through which the non-display area passes, a chamber communicating with the hole and receiving the driving module, and a shock absorbing member disposed on an inner wall of the hole to protect one of the i) lower protecting film and the flexible substrate; and ii) the flexible circuit board.

2. The rollable display device of claim 1, wherein:
the display area is disposed on the flexible substrate, and
the non-display area comprises an outer portion of the display area of the lower protecting film and the flexible substrate.

3. The rollable display device of claim 2, wherein the housing further comprises:
a lower supporting body having an opening disposed at an upper edge of the lower supporting body; and
an upper supporting body connected to the lower supporting body via the opening and including the hole disposed at one lateral surface of the upper supporting body.

4. The rollable display device of claim 3, wherein:
the hole is opened toward the display area, and
the chamber comprises an inner space defined at least in part by the upper supporting body and the lower supporting body.

5. The rollable display device of claim 4, wherein:
the flexible display panel comprises an encapsulation layer covering the display area and a window covering the encapsulation layer, and
a sealant is disposed between the window and the upper supporting body.

6. The rollable display device of claim 4, wherein:
the non-display area comprises a first bent portion disposed in the chamber,
the printed circuit board is disposed at a bottom of the lower supporting body, and
the flexible circuit board is disposed between the non-display area and the printed circuit board, and has a second bent portion.

7. The rollable display device of claim 6, wherein:
a pad is disposed at an edge of the non-display area,
the flexible circuit board comprises an output pad connected to the pad and an input pad connected to the printed circuit board, and
the second bent portion is closer to the input pad than the output pad.

8. The rollable display device of claim 6, wherein:
the flexible display panel comprises a touch sensing portion disposed on the display area and a touch connecting portion connecting the touch sensing portion and the printed circuit board, and
the touch connecting portion extends through the hole into the chamber, and has a third bent portion.

9. The rollable display device of claim 8, wherein:
the shock absorbing member is fixed to an inner wall of the upper supporting body to protect the first bent portion and the third bent portion.

10. The rollable display device of claim 2, wherein the housing comprises:
an inner supporting body comprising an upper surface, a lower surface, and a lateral surface having a convex portion in a semi-cylindrical shape, and
an outer supporting body spaced apart from the inner supporting body and having a cover portion covering some of the upper surface, a lateral wall covering the convex portion, and a bottom portion entirely covering the lower surface.

11. The rollable display device of claim 10, wherein:
the hole comprises a space between an edge of the cover portion and the inner supporting body, and
the chamber comprises a space between the inner supporting body and the outer supporting body.

12. The rollable display device of claim 11, wherein:
some of the display area and the non-display area are disposed on an upper surface of the inner supporting body,
the flexible display panel comprises an encapsulation layer covering the display area and a window, and
a sealant is disposed between the window and the cover portion.

13. The rollable display device of claim 12, wherein the non-display area received in the chamber is covered with an auxiliary sealant.

14. The rollable display device of claim 11, wherein:
the flexible circuit board comprises a fourth bent portion adjacent to the convex portion and disposed between the convex portion and the lateral wall, and
the printed circuit board is disposed between a lower surface of the inner supporting body and the bottom portion.

15. The rollable display device of claim 14, wherein:
the flexible circuit board comprises a driver IC, and
the convex portion has a groove portion accommodating the driver IC.

16. The rollable display device of claim 14, wherein:
the flexible display panel comprises a touch sensing portion disposed on the display area and a touch connecting portion connecting the touch sensing portion and the printed circuit board, and
the touch connecting portion is disposed in the chamber through the hole and comprises a fifth bent portion adjacent to the convex portion.

17. The rollable display device of claim 16, wherein:
the shock absorbing member is fixed to an inner side of a lateral wall facing the convex portion to protect the fourth bent portion and the fifth bent portion.

18. The rollable display device of claim 1, wherein:
at least some of the plurality of supporters extend along a first direction and are linked to adjacent supporters by respective hinge linking portions disposed along a second direction intersecting the first direction, and
wherein at least two adjacent supporters of the plurality of supporters are configured to be disposed at an angle relative to each other of less than about 180°.

19. The rollable display device of claim 18, wherein each of the plurality of supporters has a width that gradually increases along the second direction, and the housing has the largest width.

20. The rollable display device of claim 19, wherein the panel supporting portion is configured to be rolled two or more times.

* * * * *